(12) United States Patent
Kobayashi (10) Patent No.: US 9,106,773 B2
(45) Date of Patent: Aug. 11, 2015

(54) MULTIFUNCTION APPARATUS AND READING DEVICE

(71) Applicant: FUJI XEROX CO., LTD., Tokyo (JP)

(72) Inventor: Ken Kobayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 53 days.

(21) Appl. No.: 14/053,850

(22) Filed: Oct. 15, 2013

(65) Prior Publication Data

US 2014/0376059 A1     Dec. 25, 2014

(30) Foreign Application Priority Data

Jun. 24, 2013   (JP) ................................. 2013-131702

(51) Int. Cl.
*H04N 1/00*     (2006.01)
*H04N 1/40*     (2006.01)

(52) U.S. Cl.
CPC ....... *H04N 1/00082* (2013.01); *H04N 1/00005* (2013.01)

(58) Field of Classification Search
None
See application file for complete search history.

(56) References Cited

U.S. PATENT DOCUMENTS

2006/0126132 A1* 6/2006 Murakami et al. ............ 358/498
2008/0112021 A1* 5/2008 Katsuyama .................. 358/498

FOREIGN PATENT DOCUMENTS

| JP | 2005086598 A | 3/2005 |
| JP | 2010-021832 A | 1/2010 |
| JP | 2010161745 A | 7/2010 |
| JP | 2010-206696 A | 9/2010 |
| JP | 2012244383 A | 12/2012 |

OTHER PUBLICATIONS

Office Action issued by Japanese Patent Office, corresponding to Japanese Patent Application No. 2013131702, dated Nov. 5, 2013.

* cited by examiner

*Primary Examiner* — Quang N Vo
(74) *Attorney, Agent, or Firm* — Sughrue Mion, PLLC

(57) ABSTRACT

A multifunction apparatus includes a transporting unit that transports the document, a reading unit that irradiates the document passing through a reading position with light and reads reflected light so as to generate image information representing an edge of the document and an image of the document, an inclination amount calculating unit that calculates an inclination amount of the document on the basis of the image information; a first inclination correcting unit that corrects an inclination of the image represented by the image information, on the basis of the inclination amount of the document, so as to generate new image information representing the image whose inclination is corrected, and a controller that prevents, in a transmission mode for transmitting image information, the first inclination correcting unit from performing an image inclination correction operation, and transmits a facsimile signal on the basis of the image information generated by the reading unit.

6 Claims, 12 Drawing Sheets

MULTIFUNCTION APPARATUS AND READING DEVICE

CROSS-REFERENCE TO RELATED APPLICATIONS

This application is based on and claims priority under 35 USC 119 from Japanese Patent Application No. 2013-131702 filed Jun. 24, 2013.

BACKGROUND

Technical Field

The present invention relates to a multifunction apparatus and a reading device.

SUMMARY

According to an aspect of the invention, there is provided a multifunction apparatus that includes an image reading device which reads an image formed on a document so as to generate image information and an image forming device which forms an image on paper on the basis of the image information, and that has at least a facsimile function and a copy function. The multifunction apparatus includes a transporting unit that transports the document such that the document passes through a reading position; a reading unit that irradiates the document passing through the reading position with light and reads reflected light so as to generate image information representing an edge of the document and the image of the document; an inclination amount calculating unit that calculates an inclination amount of the document passing through the reading position, on the basis of the image information obtained by the reading unit; a first inclination correcting unit that corrects an inclination of the image represented by the image information which is generated by the reading unit by reading the document, on the basis of the inclination amount of the document calculated by the inclination amount calculating unit, so as to generate new image information representing the image whose inclination is corrected; and a controller that prevents, in a transmission mode for transmitting image information using the facsimile function, the first inclination correcting unit from performing an image inclination correction operation, and transmits a facsimile signal on the basis of the image information before inclination correction which is generated by the reading unit by reading the document for image information transmission.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described.

Figure 1:
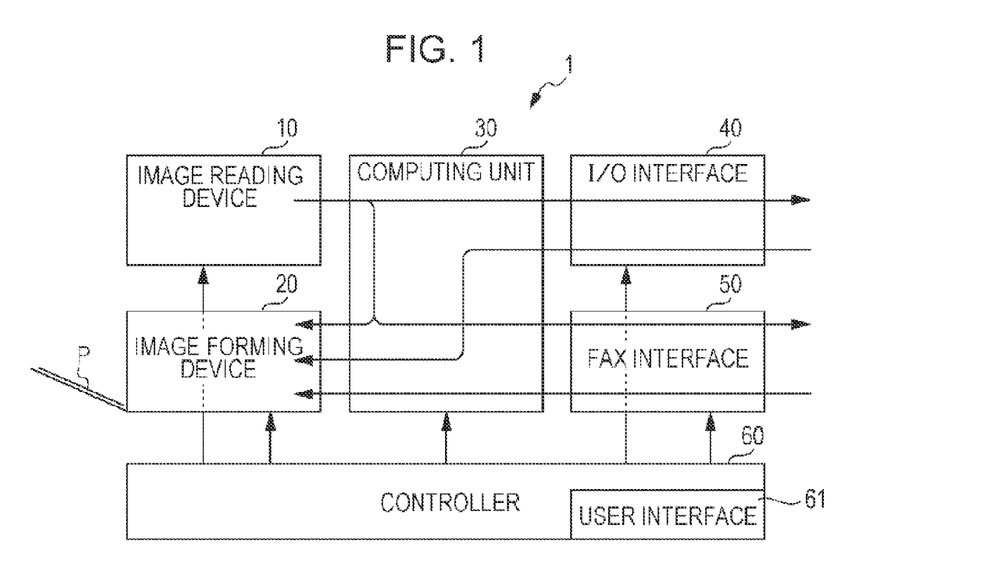
FIG. 1 is a block diagram showing a multifunction apparatus according to an exemplary embodiment.

FIG. 1 is a block diagram showing a multifunction apparatus 1 according to an exemplary embodiment.

The multifunction apparatus 1 includes an image reading device 10 and an image forming device 20.

The image reading device 10 reads an image of the document so as to generate image information. In the image reading device 10, a document on which an image to be read is recorded is transported through a transport path that passes through a reading position. When the document passes through the reading position, the image of the document is read. A more detailed description will be given below.

Further, in the image forming device 20, an image is formed on paper P on the basis of the image information. The paper P with the image formed thereon is ejected from the image forming device 20. In this exemplary embodiment, the image forming device 20 is a so-called electrophotographic image forming device. However, the image forming device 20 is not limited to an electrophotographic image forming device, and may include inkjet image forming devices and other types of image forming devices.

As will be described below, image information on the basis of which an image is formed by the image forming device 20 is not limited to image information obtained by reading an image of a document in the image reading device 10, but may include image information input from the outside.

The multifunction apparatus 1 further includes a computing unit 30. The computing unit 30 performs various types of computational processing corresponding to the mode thereof, on the basis of the image information obtained by the image reading device 10 or the image information input from the outside.

The multifunction apparatus 1 further includes an I/O interface 40 and a FAX interface 50.

The I/O interface 40 is responsible for communication between the multifunction apparatus 1 and an image editing apparatus (not shown) which typically includes a computer. The I/O interface 40 receives the image information obtained by the image reading device 10 via the computing unit 30, and transmits the image information to the image editing apparatus. In this case, the multifunction apparatus 1 serves as a scanner. Further, the I/O interface 40 receives image information transmitted from the image editing apparatus. The image information received by the I/O interface 40 is transmitted to the image forming device 20 via the computing unit 30. The image forming device 20 forms an image on paper on the basis of the transmitted image information. In this case, the multifunction apparatus 1 serves as a printer.

The FAX interface 50 is a module that is connected to a telephone line so as to provide a facsimile function. That is, when in a FAX transmission mode, the image reading device 10 reads a document on which an image to be transmitted by facsimile is recorded so as to generate image information. The generated image information is output to a telephone line via the computing unit 30 and the FAX interface 50 so as to be transmitted to a recipient. When in a FAX reception mode, image information transmitted via a telephone line is received by the FAX interface 50, and is input to the image forming device 20 via the computing unit 30. The image forming device 20 prints an image on paper on the basis of the input image information.

Further, the multifunction apparatus 1 has a copy function. In a copy mode, image information obtained by reading a document in the image reading device 10 is input to the image forming device 20 via the computing unit 30. The image forming device 20 prints an image on paper on the basis of the input image information.

The multifunction apparatus 1 further includes a controller 60. The controller 60 includes a user interface 61. The controller 60 performs all the control operations required by the multifunction apparatus 1, such as switching the above described various functions and modes in accordance with an instruction input by the user from the user interface 61 or the like, for example.

The computing unit 30, the I/O interface 40, the FAX interface 50, and the controller 60 may be disposed in either a housing of the image reading device 10 or a housing of the image forming device 20, or may be separately disposed in the housing of the image reading device 10 and the image forming device 20. As will be described below, in an example illustrated in FIG. 4 and other drawings, these components are disposed in the housing of the image forming device 20. However, in the example illustrated in FIG. 4 and other drawings, the user interface 61 is disposed on the upper surface of the housing of the image forming device 20. When data is transmitted to a telephone line by facsimile, the result obtained by reading the document may be checked by the sender of the facsimile. However, in most cases, the result obtained by reading the document is checked by the recipient of the facsimile. On the other hand, when a document is copied, the result obtained by reading the document is checked by a person who copied the document. Accordingly, if part of the document is missing from the output result, the missing part of the document is more likely to be overlooked when the document is faxed than when the document is copied, because the output result of the facsimile function is unclear, or because the output result is not checked against the original document.

Note that although the scanner function is described above, the multifunction apparatus of the present invention may have at least a FAX function and a copy function, and does not have to have a scanner function. As for the scanner function, unlike the copy function whose output result is immediately printed on paper, it is difficult to visually check the result in detail. Therefore, a below-described process that is compatible with the facsimile function and is configured to determine whether to correct the inclination may be employed.

Figure 2:
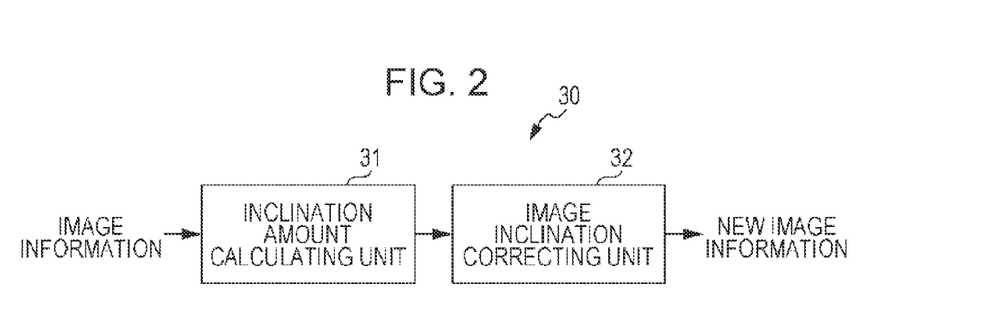
FIG. 2 is a block diagram showing a few functions of a computing unit of the multifunction apparatus of FIG. 1.

FIG. 2 is a block diagram showing a few functions of the computing unit 30 of the multifunction apparatus 1 of FIG. 1.

The computing unit 30 performs various computations on the basis of image information. Among those, computation for correcting an inclination of the image on the basis of image information as one feature of this exemplary embodiment will be described.

As mentioned above, in the image reading device 10, a document is transported through a transport path that passes through a reading position. When the document passes through the reading position, the image of the document is read. The document that is being transported is often slightly inclined. If the document that is being transported is inclined, the image recorded on the document is read with the same inclination amount as the inclination amount of the document. Thus, image information representing an inclined image is generated.

Among computations performed by the computing unit 30, the computation illustrated in FIG. 2 is a computation for correcting an inclination of the image represented by image information.

The image information obtained by reading the document in the image reading device 10 is input to an inclination amount calculating unit 31 of the computing unit 30. As will be described below in detail, the image information obtained by the image reading device 10 includes information on the image recorded on the document and information on a boundary between the document and the background around the document, that is, the edge of the document. The inclination amount calculating unit 31 calculates the inclination amount of the document on the basis of information on the edge of the document included in the input image information.

When the inclination amount of the document is calculated, an image inclination correcting unit 32 corrects the inclination of the image represented by the image information, and generates new image information representing the image whose inclination is corrected. Note that although the inclination amount is calculated in this exemplary embodiment, the inclination amount does not have to be calculated if the inclination is detected without calculating the inclination amount. For example, a document is transported with an inclination toward a predetermined side. Then, one edge of the document is fixed by corner registration. The timing that the edge passes through a predetermined point after passing through a certain location is measured. Measurement results and the inclination angle are stored in advance in a matrix. Thus, the inclination of the document may be directly detected on the basis of the measurement result.

FIGS. 3A through 3D are diagrams showing computation performed by the inclination amount calculating unit 31 and the image inclination correcting unit 32 of FIG. 2.

The inclination amount calculating unit 31 calculates the inclination amount of the document by using Hough transform. Further, the image inclination correcting unit 32 performs rotation processing of affine transformation so as to rotate the image of the document in the image information by the amount corresponding to the inclination amount thereof, and thus generates new image information representing the image with no inclination.

Hough transform and affine transformation are well-known computing methods, and therefore will be only briefly described herein.

Figure 3A:
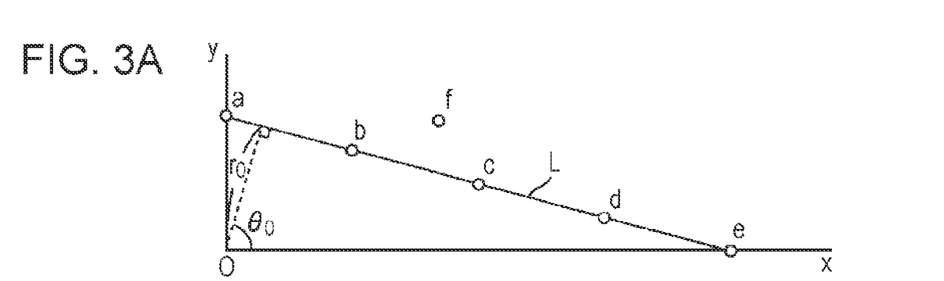
FIGS. 3A through 3D are diagrams showing computation performed by an inclination amount calculating unit and an image inclination correcting unit of FIG. 2.
Figure 3B:
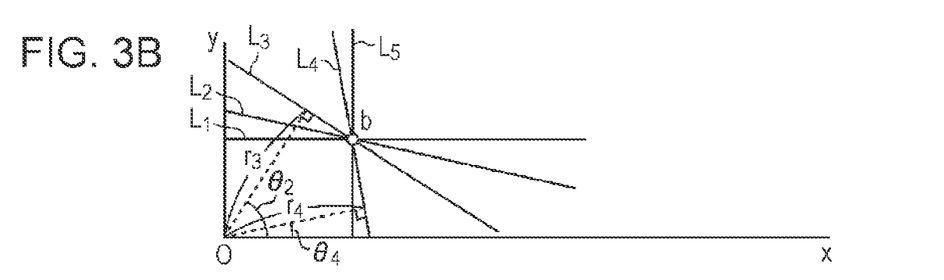
Figure 3C:
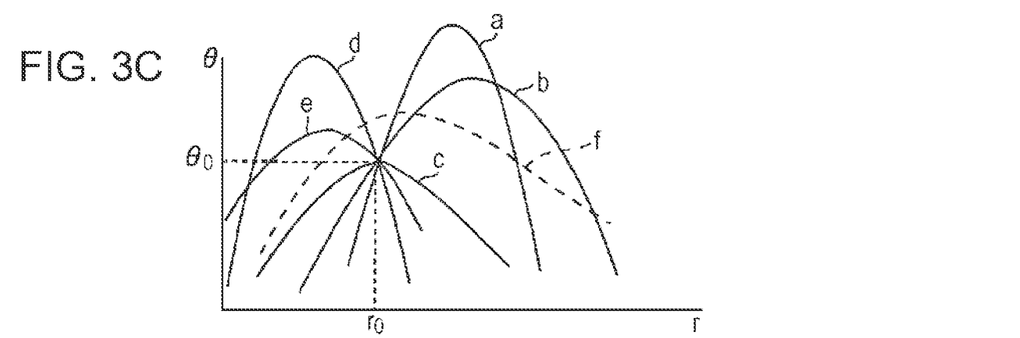

FIGS. 3A through 3C illustrate Hough transform.

As mentioned above, a document is transported through a transport path that passes through a reading position. When the document passes through the reading position, the image of the document is read, so that image information is generated. This image information includes information on an edge of the document.

A horizontal axis x in FIG. 3A represents the position of the width direction of the document, and a vertical axis y represents the transport direction of the document.

A line L in FIG. 3A is a line obtained as image information and representing the leading edge of the document. However, this line is still unknown, and points a through f that are expected to be on the leading edge of the document are extracted from the generated image information. Among these points a through f, although there are many points (points a through e in this example) that represent the leading edge of the document, there is an erroneous point (point f in this example).

The line is expressed by the following equation:

$$r = x \cos\theta + y \sin\theta \qquad (1)$$

where r is the length of a perpendicular line drawn from an origin O to this line, and θ is the inclination. As illustrated in FIG. 3A, when $$r = r_0, \theta = \theta_0 \quad (2)$$

are determined, the line L of FIG. 3A is uniquely determined.

Hough transform is a computing method for obtaining (r, θ)=($r_0$, $\theta_0$).

FIG. 3B illustrates the point b of FIG. 3A and various lines passing through the point b (five lines $L_1$ through $L_5$ in this example).

Lines perpendicular to the lines $L_1$ through $L_5$ are drawn from the origin O. The perpendicular lines have lengths $r_i$ and angles $\theta_i$ (i=1, ..., 5). In FIG. 3B, two lines $L_3$ and $L_4$ have lengths $r_3$ and $r_4$ and angles $\theta_3$ and $\theta_4$.

FIG. 3C illustrates a Hough space representing a length r (horizontal axis) and an angle θ (vertical axis) of a perpendicular line.

When the lengths r and angles θ of lines perpendicular to a large number of lines of FIG. 3B passing through the point b are plotted, a sinusoidal curve shown as a graph b in FIG. 3C is obtained. The curve of the graph b represents a set of lines passing through the point b.

Similarly, not only for the point b of FIG. 3A, a graph representing lengths r and angles θ of perpendicular lines is obtained for each of the points a through f. Thus, as shown in FIG. 3C, graphs a through f are obtained.

The graphs for the points (points a through e in this example) correctly located on the leading edge of the document are curves that pass through a certain point ($r_0$, $\theta_0$) in the Hough space of FIG. 3C. On the other hand, the graph f representing a set of lines passing through the erroneous point (point f in this example) is a curve that does not pass through the point ($r_0$, $\theta_0$).

In this way, points expected to be points on the leading edge of the document are extracted from the image information, and a large number of graphs as shown in FIG. 3C are calculated. Then, a point where many of the graphs cross is detected so as to specify the line L ($r_0$, $\theta_0$) of FIG. 3A.

The inclination amount calculating unit 31 of FIG. 2 recognizes the leading edge of the document by performing Hough transform on the basis of the image information as described above, and thus obtains an inclination angle of the document.

Figure 3D:
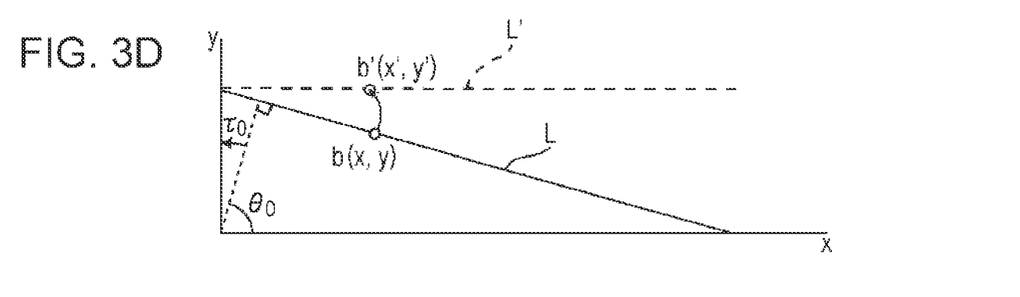

FIG. 3D illustrates computational processing performed by the image inclination correcting unit 32 of FIG. 2.

In FIG. 3D, the line L representing the leading edge of the document is shown.

In this stage, the line L is uniquely determined by Hough transform which is described with reference to FIGS. 3A through 3C. That is, the angle $\theta_0$ is determined.

Accordingly, in order to obtain a line L' with no inclination by correcting the inclination of the line L, the line L is rotated by:

$$\tau_0 = 90° - \theta_0 \quad (3)$$

When the coordinates of a point (point b in this example) on the line L are (x, y), new coordinates (x', y') obtained by rotating the point b by an angle $\tau_0$ are expressed as follows:

$$x' = x \cos \tau_0 - y \sin \tau_0$$

$$y' = x \sin \tau_0 + y \cos \tau_0 \quad (4)$$

The image inclination correcting unit 32 of FIG. 2 converts the coordinates of the all the pixels of the image represented by the image information, using the above equations (4). Thus, the image information representing the inclined image obtained by reading the inclined document is converted into new image information representing the image obtained by reading the document with no inclination.

Next, a specific example of the multifunction apparatus 1 depicted in the block diagram of FIG. 1 will be described.

Figure 4:
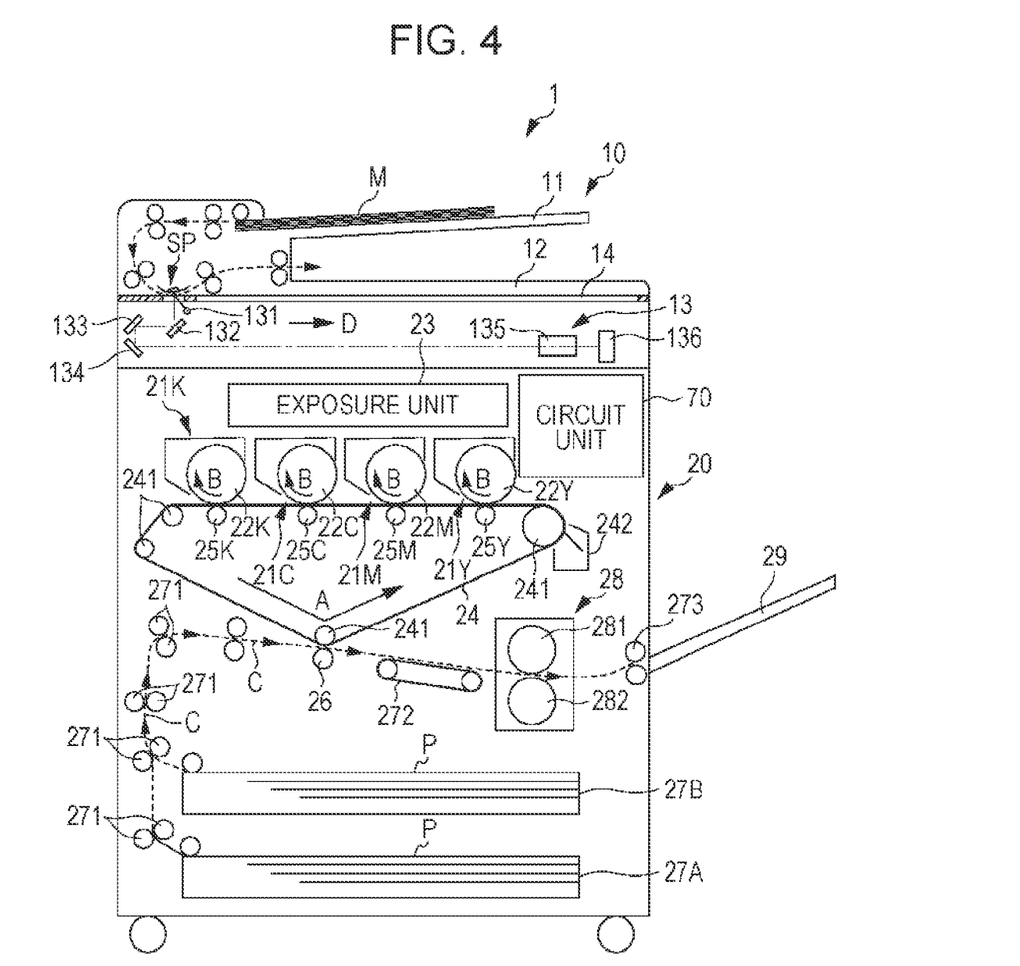
FIG. 4 is a schematic diagram showing the hardware configuration of the multifunction apparatus depicted in the block diagram of FIG. 1.

FIG. 4 is a schematic diagram showing the hardware configuration of the multifunction apparatus 1 depicted in the block diagram of FIG. 1.

FIG. 4 illustrates the configuration of the image reading device 10 and the image forming device 20 of the multifunction apparatus 1 of FIG. 1. The other components (the computing unit 30, the I/O interface 40, the FAX interface 50, and the controller 60) shown in FIG. 1 are integrated into one block as a circuit unit 70. Note that the user interface 61 will be separately described below with reference to FIG. 5. The image reading device 10 has a transport reading mode and a stationary reading mode as reading modes for reading an image of the document.

In the transport reading mode, documents M placed on a document tray 11 are transported one by one through the transport path indicated by the broken line, in response to a user's operation. Thus, each document passes through a reading position SP. When passing through the reading position SP, an image recorded on the document is illuminated by a lamp 131. A reflected light thereof is guided to a reading sensor 136 via reflective mirrors 132, 133, and 134 and a lens 135 of a reading optical system 13, and is read by the reading sensor 136. Thus, image information is generated. The document M having passed through the reading position SP is ejected onto a document output tray 12. A transporting unit that transports the document M will be described below in detail.

The image reading device 10 includes transparent glass 14 on which a document is placed. In the image reading device 10, a hinge is provided that laterally extends at the end thereof in a direction perpendicular to the paper surface of FIG. 4. Thus, the near side thereof may be lifted such that the upper part of the transparent glass 14 is exposed.

In the stationary reading mode, the near side is lifted, and the document M is placed face down on the transparent glass 14. Then, the document is held between the transparent glass 14 and the lower surface of the document output tray 12. Thus, when a reading operation starts in response to a user's operation, the lamp 131 and the mirrors 132 through 134 move along the lower surface of the transparent glass 14 in the direction of the arrow D. The reading sensor 136 reads the image of the document, so that image information is generated.

Next, the overview of the image forming device 20 will be described.

The image forming device 20 is a device that forms an image on paper P by a so-called electrophotographic system.

The image forming device 20 includes image forming units 21K, 21C, 21M and 21Y that form toner images using black (K), cyan (C), magenta (M), and yellow (Y) toner, respectively.

In the following description, in the case where there is no need to distinguish colors, the letters representing colors K, C, M, and Y are omitted, and only reference numerals are used.

Each image forming unit 21 includes an electrophotographic photoreceptor 22 that rotates in the direction of the arrow B. The photoreceptor 22 is charged by a charger (not shown), and is irradiated with exposure light from an exposure unit 23. Thus, an electrostatic latent image is formed on the photoreceptor 22. The electrostatic latent image is developed with toner by a developing unit (not shown), so that a toner image of the corresponding color is formed on the photoreceptor 22.

Further, under the image forming units 21, an intermediate transfer belt 24 is disposed along the array of photoreceptors 22 and is suspended by rollers 241 so as to circulate in the direction of the arrow A. Further, first transfer rollers 25 are disposed in positions facing the respective photoreceptors 22 with the intermediate transfer belt 24 therebetween.

The toner images of different colors formed on the photoreceptors 22 are sequentially transferred and superposed on the intermediate transfer belt 24 by the action of the respective first transfer rollers 25.

Each image forming unit 21 includes a cleaner (not shown) for cleaning an area of the photoreceptor 22 after transfer. The surface of the photoreceptor 22 is cleaned by the cleaner.

The image forming device 20 further includes a second transfer roller 26 such that the toner images sequentially transferred and superposed on the intermediate transfer belt 24 are transferred onto the transported paper P.

The image forming device 20 includes, at its lower part, a first tray 27A and a second tray 27B for storing paper. Upon transferring the toner images onto the paper P, a sheet of paper P is pulled from either one of the sheet trays 27A and 27B, and is transported in the direction of the arrows C by transport rollers 271, and then the toner images on the intermediate transfer belt 24 are transferred onto the paper P when the paper P passes through the position of the second transfer roller 26. The paper P with the toner images transferred thereon is further transported by a transport belt 272, and passes through a fixing unit 28. The fixing unit 28 includes a heating roller 281 and a pressure roller 282. The transported paper P with unfixed toner images is held between the heating roller 281 and the pressure roller 282 so as to be heated and pressed. Thus, the unfixed toner images are fixed onto the paper P. The paper P on which an image formed of the fixed toner images is printed is ejected onto a paper output tray 29 by ejection rollers 273.

After the toner images on the intermediate transfer belt 24 are transferred onto the sheet P by the action of the second transfer roller 26, the surface of the intermediate transfer belt 24 is cleaned by a cleaner 242.

Figure 5:
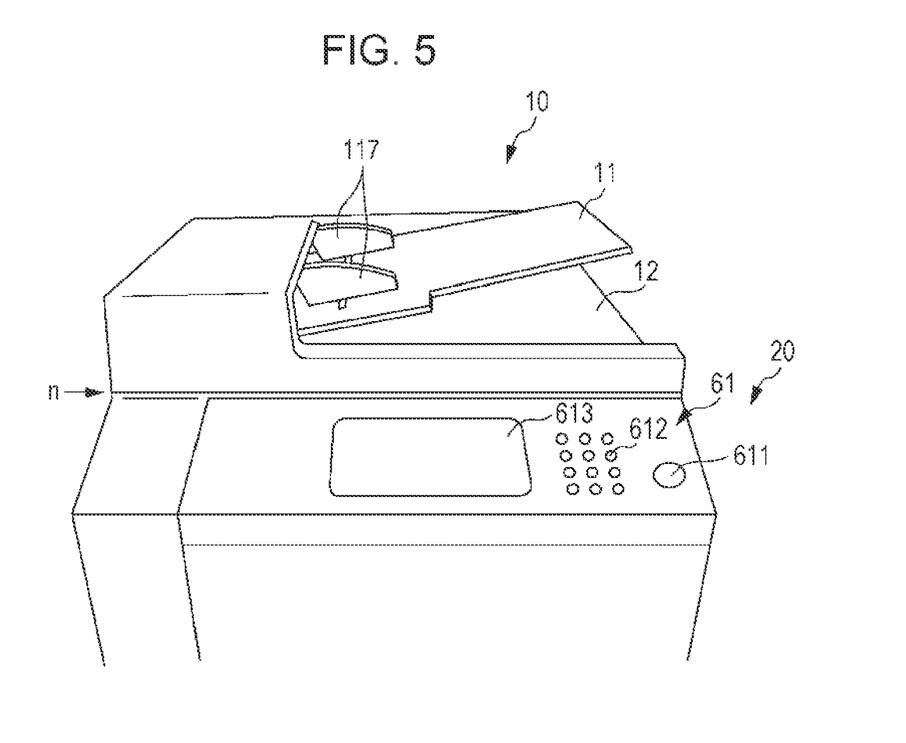
FIG. 5 is an external perspective view showing the upper part of the multifunction apparatus of FIG. 4.

FIG. 5 is an external perspective view showing the upper part of the multifunction apparatus of FIG. 4.

FIG. 5 illustrates the external view of the image reading device 10 and the upper part of the image forming device 20.

In the view of the image reading device 10 of FIG. 5, the document tray 11 and the document output tray 12 of FIG. 4 are illustrated. In FIG. 5, a position restricting member 117 for restricting the position of the widthwise position of the document on the document tray 11 is also illustrated. As mentioned above, the image reading device 10 is configured such that a part above the line n of FIG. 5 is hinged at the end so as to be lifted. When the upper part is lifted, the document is placed face down on the transparent glass 14 (see FIG. 4) thereunder. The lifted upper part is closed again as shown in FIG. 5, and a start button 611 is pressed. Then, the image reading device 10 reads the image of the document in the stationary reading mode as described above.

Further, in the view of the upper part of the image forming device 20 of FIG. 5, the user interface 61 (see also FIG. 1) is illustrated.

The user interface 61 of FIG. 5 includes the start button 611, a numeric keypad 612, and a touch panel 613 serving also as a display.

When the start button 611 is pressed, the image reading device 10 starts reading the document. The numeric keypad 612 is used for setting the number of copies, the FAX number of the recipient of the FAX transmission, and the like.

Further, the touch panel 613 is used for performing various settings corresponding to the screen displayed thereon. As settings that are need to explain this exemplary embodiment, mode settings such as the copy mode and the FAX transmission mode, settings for specifying whether the document to be subjected to image reading by the image reading device 10 is a standard size document or a non-standard size document, and the like are performed. The term "standard size document" as used herein refers to a document of a typical size, such as A4 size and B5 size, whose width and length are recognized in advance by the image reading device 10. For example, if a document has the same width as A4 paper but has a long length such as roll paper, or if a document is A4 size but a label is attached to the document to extend beyond the side of the document, such a document is considered as a non-standard size document.

Figure 6:
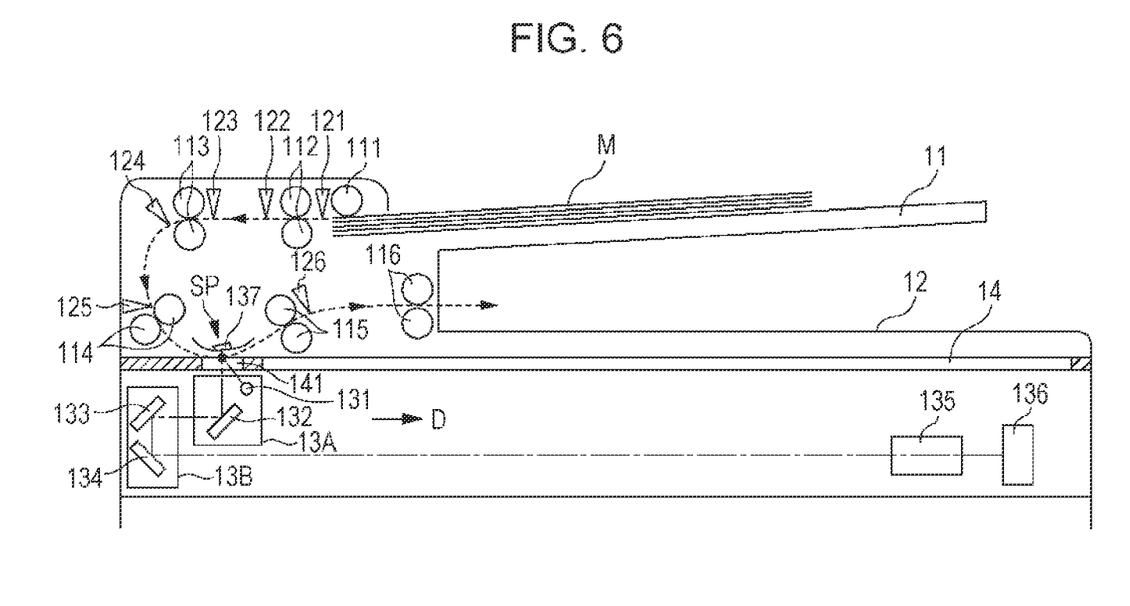
FIG. 6 illustrates an image reading device.
Figure 7:
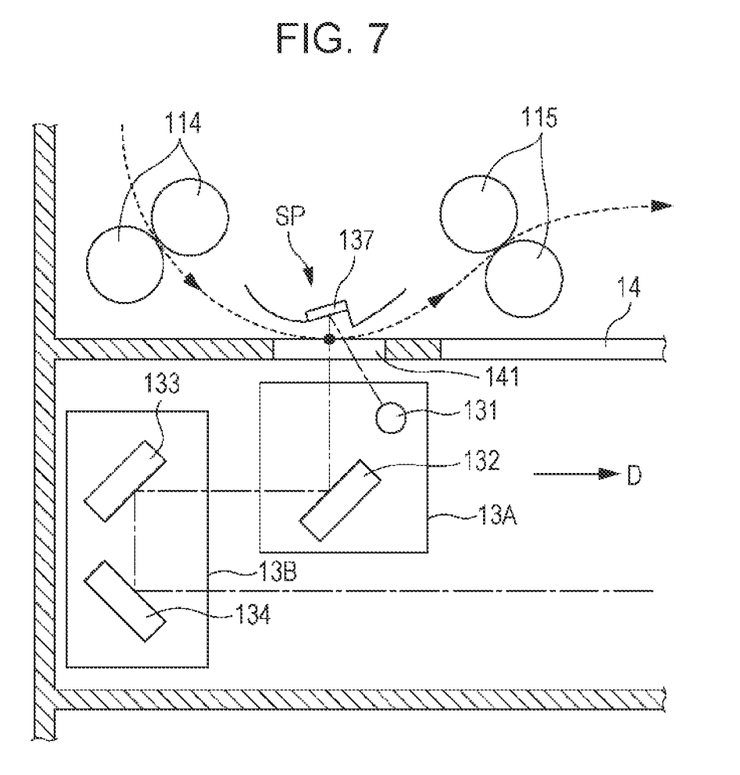
FIG. 7 is a partially enlarged view of FIG. 6.

FIG. 6 illustrates the image reading device 10 of FIGS. 1 and 4. FIG. 7 is a partially enlarged view of FIG. 6.

The document M on the document tray 11 is transported one by one through the transport path that passes through the reading position SP, and is ejected onto the document output tray 12.

In FIG. 6, as members for transporting the document M, a first roller 111, second rollers 112, third rollers 113, fourth rollers 114, fifth rollers 115, and sixth rollers 116 are illustrated. Further, as a sensor for detecting whether there is a document being transported through the transport path, a first sensor 121, a second sensor 122, a third sensor 123, a fourth sensor 124, a fifth sensor 125, and a sixth sensor 126 are illustrated.

The transport path has a function of correcting the inclination of the document M. However, when this document inclination correcting function is used, a greater amount of noise is generated than in the case where this function is not used. In view of this, it is possible to select whether to use this document inclination correcting function in accordance with the mode thereof. In the following description of this function, it is assumed that the document inclination correcting function is used.

The first roller 111 serves to feed one of plural documents M on the document tray 11 into the transport path. When the leading edge of the document M fed by the first roller 111 reaches the second rollers 112, the second rollers 112 remain at rest without rotating. Therefore, the leading edge of the fed document M hits the second rollers 112, so that the document M bends. Thus, in the case where the fed document is laterally inclined, the inclination is corrected. After that, the second rollers 112 rotate such that the document M is further transported. Then, the document M hits the third rollers 113 and bends again. Thus, the inclination of the document is corrected again. Subsequently, the document M is further fed by the third rollers 113. In order to prevent the document M from being pulled due to a velocity difference between the second rollers 112 and the third rollers 113, the document M is transported while being slightly bent between the second rollers 112 and the third rollers 113. The document transported by the third rollers 113 is further transported by the fourth rollers 114 so as to pass through the reading position SP. In this reading position SP, the document M is transported while being in contact with the upper surface of the transparent glass 141. The document M having passed through the reading position SP is further transported by the fifth rollers 115, and is ejected onto the document output tray 12 by the sixth rollers 116.

The first sensor 121 through the sixth sensor 126 detects passage of the fed document M at the respective positions of the sensors. Thus, the timing of starting rotation of the rollers, the timing of starting reading by the reading sensor 136, and the like are adjusted. As for the timing of starting reading by the reading sensor 136, in the case of performing an image inclination correction process on the image information as described with reference to FIGS. 2 and 3, the adjustment of the timing of starting reading is especially precise. Thus, compared to the case where the document inclination correction process described with reference to FIG. 6 is performed and an image inclination correction process is not performed on the image information, the timing is more accurately adjusted. That is, if the timing adjustment is more precise, although it takes time to perform an image inclination correction process on the image information, the whole document reading process is not delayed. More specifically, although a difference of 150 msec is allowed in the timing at which the document reaches the reading position in the case of not performing an image inclination correction process on the image information, the timing adjustment is performed such that a difference of only 30 msec is allowed. The timing difference is largely due to the position where the document is placed on the document tray 11. Further, transportation from the document tray 11 is usually started at a sufficiently early timing with respect to the document transportation interval. Accordingly, the leading edge of the document transported from the document tray 11 is detected on the transport path, and the timing is adjusted by adjusting the transporting velocity thereafter on the basis of the detection result.

In the reading position SP, a reflector 137 is provided at the back side of the document M passing therethrough. The reflector 137 is an example of a background unit of the present invention. The reflector 137 is oriented such that specular reflected light of the light emitted from the lamp 131 and reflected by the reflector 137 becomes incident on the reading sensor 136 via the reflective mirrors 132 through 134 and the lens 135. The reflector 137 produces reflected light having a higher light intensity than a white document so as to obtain the luminance difference from the edge of the document, and thereby detects the edge of the document in the image information obtained by the reading sensor 136.

The lamp 131 and the first mirror 132 are mounted in a first carriage 13A, while the second mirror 133 and the third mirror 134 are mounted in a second carriage 13B.

In the transport reading mode described above, that is, in a mode in which the document M is placed on the document tray 11 and is fed and transported by the first roller 111 so as to be read in the reading position SP, the first carriage 13A and the second carriage 13B remain stationary in the respective positions shown in FIGS. 6 and 7. Thus, the document M transported to the reading position SP is irradiated by the lamp 131, and the reflected light is read by the reading sensor 136. On the other hand, in the stationary reading mode, the document is placed face down on the transparent glass 14, and the first carriage 13A and the second carriage 13B move along the lower surface of the transparent glass 14 in the direction of the arrow D. In this case, the second carriage 13B moves at half the moving velocity of the first carriage 13A. Thus, the optical path length of the reflected light reflected by the document on the transparent glass 14 to the lens 135 is maintained constant, so that the image of the document is accurately focused onto the reading sensor 136.

Next, various examples in the FAX transmission mode of the above-described multifunction apparatus 1 will be described. Note that some of the below-described examples are not limited to the FAX transmission mode, but may be applied to other modes. The below-described examples are for the above-described transport reading mode.

Figure 8:
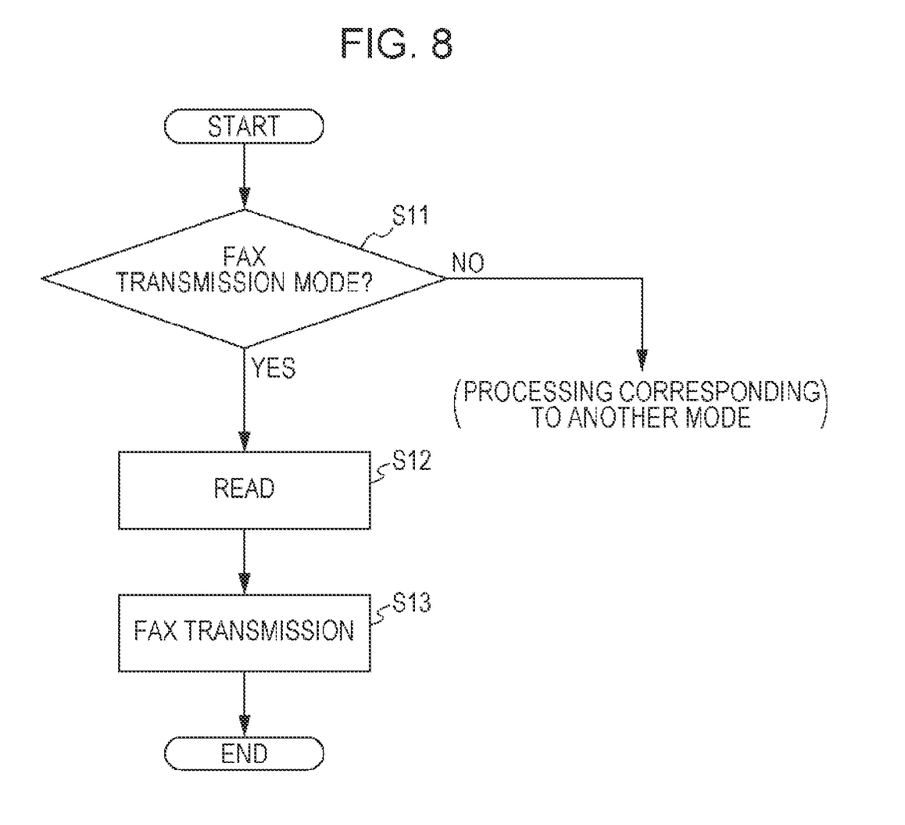
FIG. 8 is a flowchart illustrating a first example.

FIG. 8 is a flowchart illustrating a first example. The first example corresponds to a first aspect of the invention.

First, a determination is made as to whether the FAX transmission mode is selected (step S11). If the FAX transmission mode is selected, the image reading device 10 reads the image of the document (step S12). Image information obtained by reading the image is transmitted by facsimile (step S13).

That is, according to the first example, in the FAX transmission mode, a document inclination correction process is not performed by the document transporting system, and an image inclination correction process is not performed on the image information obtained by reading the image. Further, there is a case where, when a sticky note is attached to the leading edge of the document, the detected inclination of the document might be completely different from the actual inclination of the document. There is also a case where the document has a long length and thus meanders greatly. In such cases, image inclination correction often fails. Thus, in these cases, an image inclination correction process is not performed, either.

Figure 9:
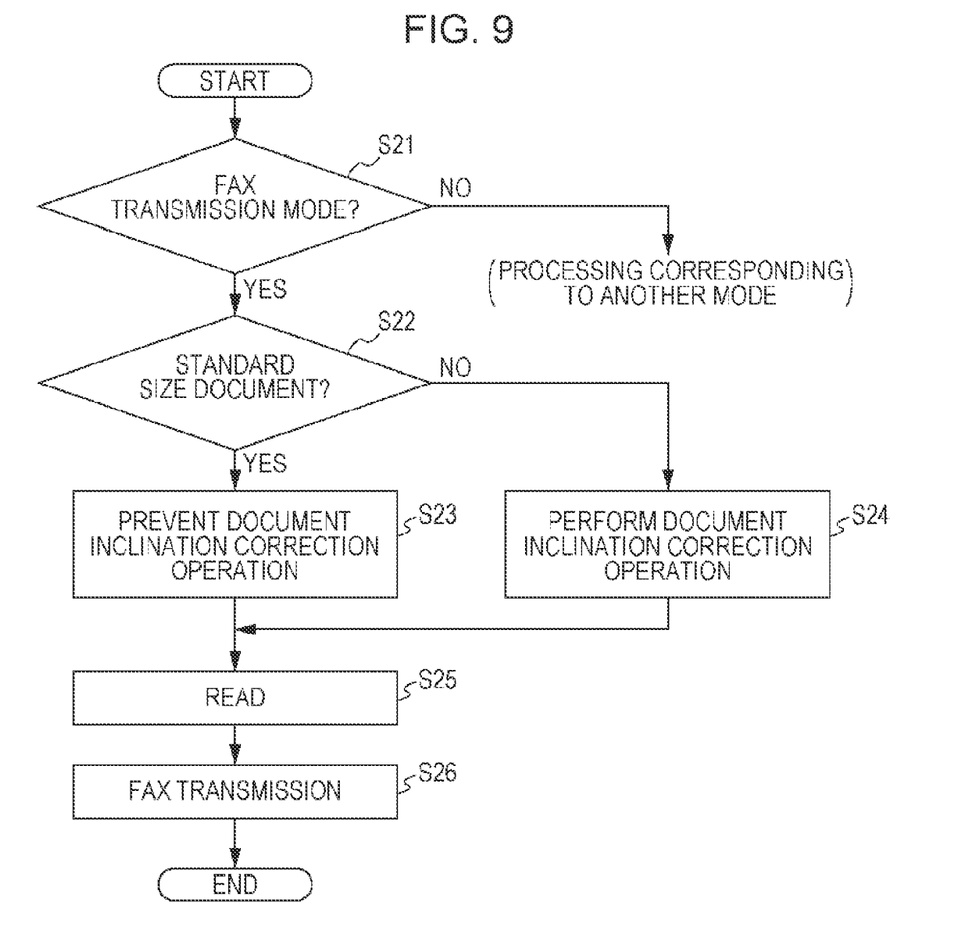
FIG. 9 is a flowchart illustrating a second example.

FIG. 9 is a flowchart illustrating a second example. The second example corresponds to a fourth aspect of the invention.

Similar to the above example, a determination is first made as to whether the FAX transmission mode is selected (step S21). When the FAX transmission mode is selected, a determination is made as to whether the document is a standard size document or a non-standard size document. The definition of the standard size and non-standard size are described above. As mentioned above, it is assumed that the user specifies whether the document has a standard size of a non-standard size by using the user interface 61 (see FIGS. 1 and 5). In the case where the user places a standard size document but it is difficult to read the document as a standard size document, such as when a sticky note is attached to a standard size document or when an end of a standard size document is missing, the user may specify whether a sticky note is attached or whether an end of a document is missing such that the document is recognized as a non-standard document. Note that such settings may not be made by the user, and the image reading device 10 may include a sensor for measuring the size of the document placed on the document tray 11 (see FIGS. 4 and 6) such that the sensor determines whether the document is a standard size document or a non-standard size document.

If the document is determined to be a standard size document in step S22, a document inclination correction operation in the transporting system is prevented (step S23). On the other hand, if the document is determined to be a non-standard size document in step S22, a document inclination correction operation is performed by causing the document to hit the rollers (step S24).

Then, the image of the transported document is read (step S25), and image information obtained by reading the image is transmitted by facsimile (step S26).

For users who mostly use standard size documents and rarely use non-standard size documents, the second example is useful.

Figure 10:
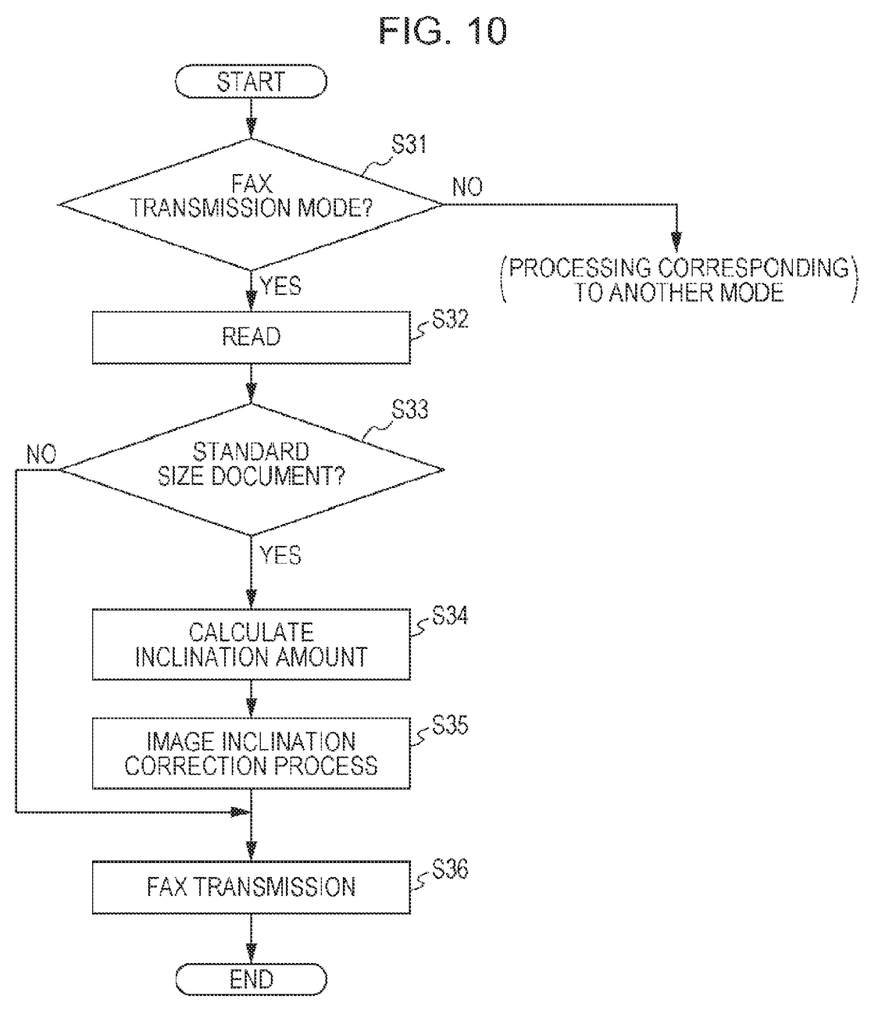
FIG. 10 is a flowchart illustrating a third example.

FIG. 10 is a flowchart illustrating a third example. The third example corresponds to a second aspect of the invention.

Similar to the above examples, a determination is first made as to whether the FAX transmission mode is selected (step S31), and the document is read (step S32). In this case, a document inclination correction operation is not performed.

When the document is read, a determination is made as to whether the read document is a standard size document (step S33). If the document is a standard size document, the inclination amount of the document in the image information is calculated as described with reference to FIGS. 2 and 3 (step S34). Then, an image inclination correction process is performed on the basis of the calculated inclination amount of the document (step S35). New image information generated by the inclination correction process is transmitted (step S36).

On the other hand, if the document is determined to be a non-standard size document in step S33, the image information obtained by reading the document in step S32 is transmitted without any change.

The third example is useful for the users who mostly use standard size documents.

Figure 11:
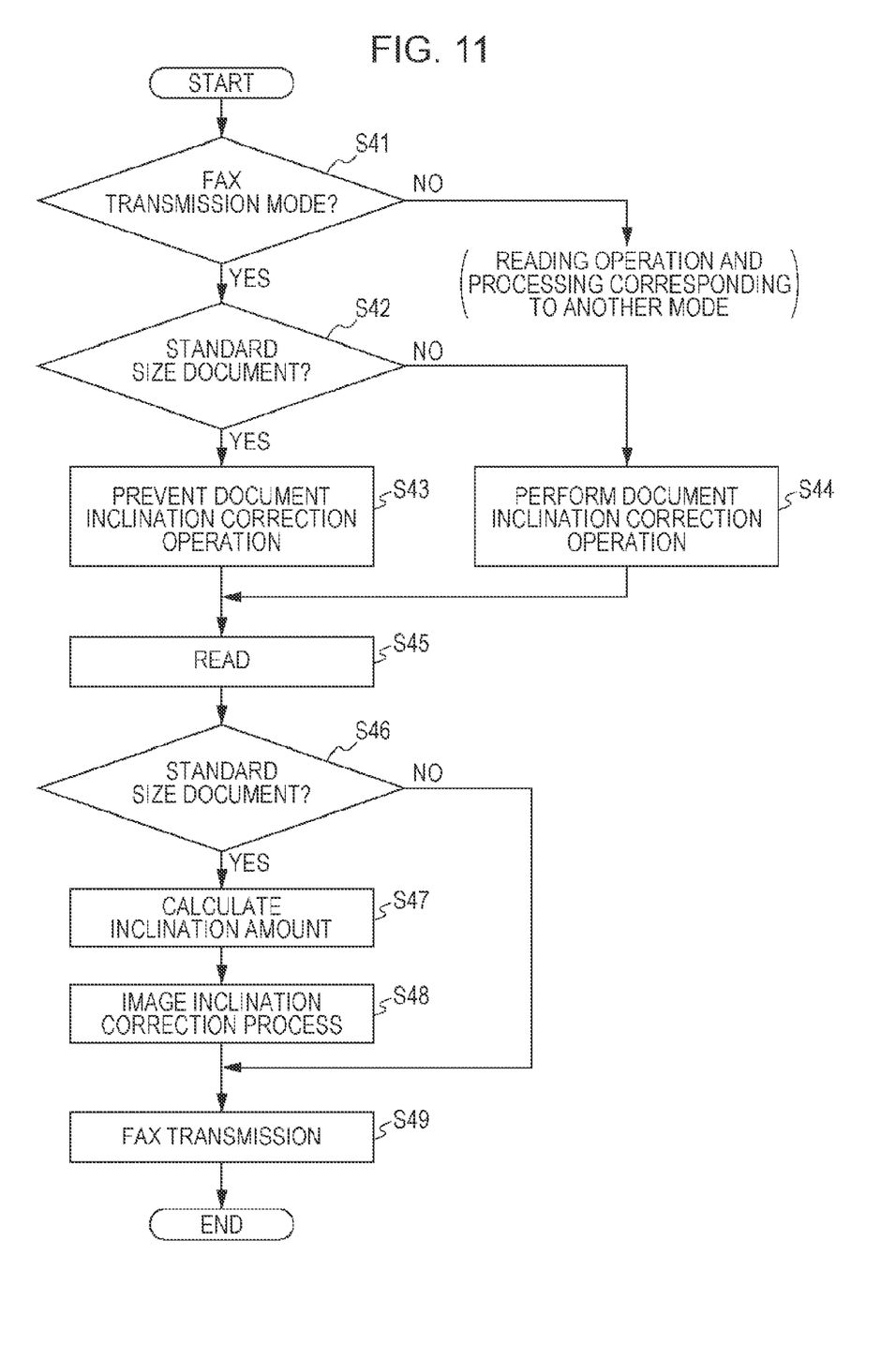
FIG. 11 is a flowchart illustrating a fourth example.

FIG. 11 is a flowchart illustrating a fourth example. The fourth example corresponds to a fifth aspect of the invention.

Similar to the above examples, a determination is first made as to whether the FAX transmission mode is selected (step S41). When the FAX transmission mode is selected, a determination is made as to whether the document is a standard size document (step S42).

If the document is a standard size document, a document inclination correction operation that causes the document to hit the rollers in the transporting system is prevented (step S43). On the other hand, if the document is a non-standard size document, a document inclination correction operation is performed (step S44). Then, a reading operation is performed (step S45).

Next, a determination is made again as to whether the document is a standard size document (step S46). If the document is a standard size document, a document inclination amount calculation process (step S47) and an image inclination correction process (step S48) are performed on the image information. When the document is a standard size document, new image information obtained in this way is transmitted. If the document is a non-standard size document, the image information obtained by the reading operation of step S45 is transmitted without any change (steps S46 and S49).

According to the fourth example, priority is transmitting an image with no inclination by facsimile. Thus, in the case of a non-standard size document, since an image inclination correction process on the image information might fail, the inclination of the document is corrected by causing the document to hit the rollers.

Figure 12:
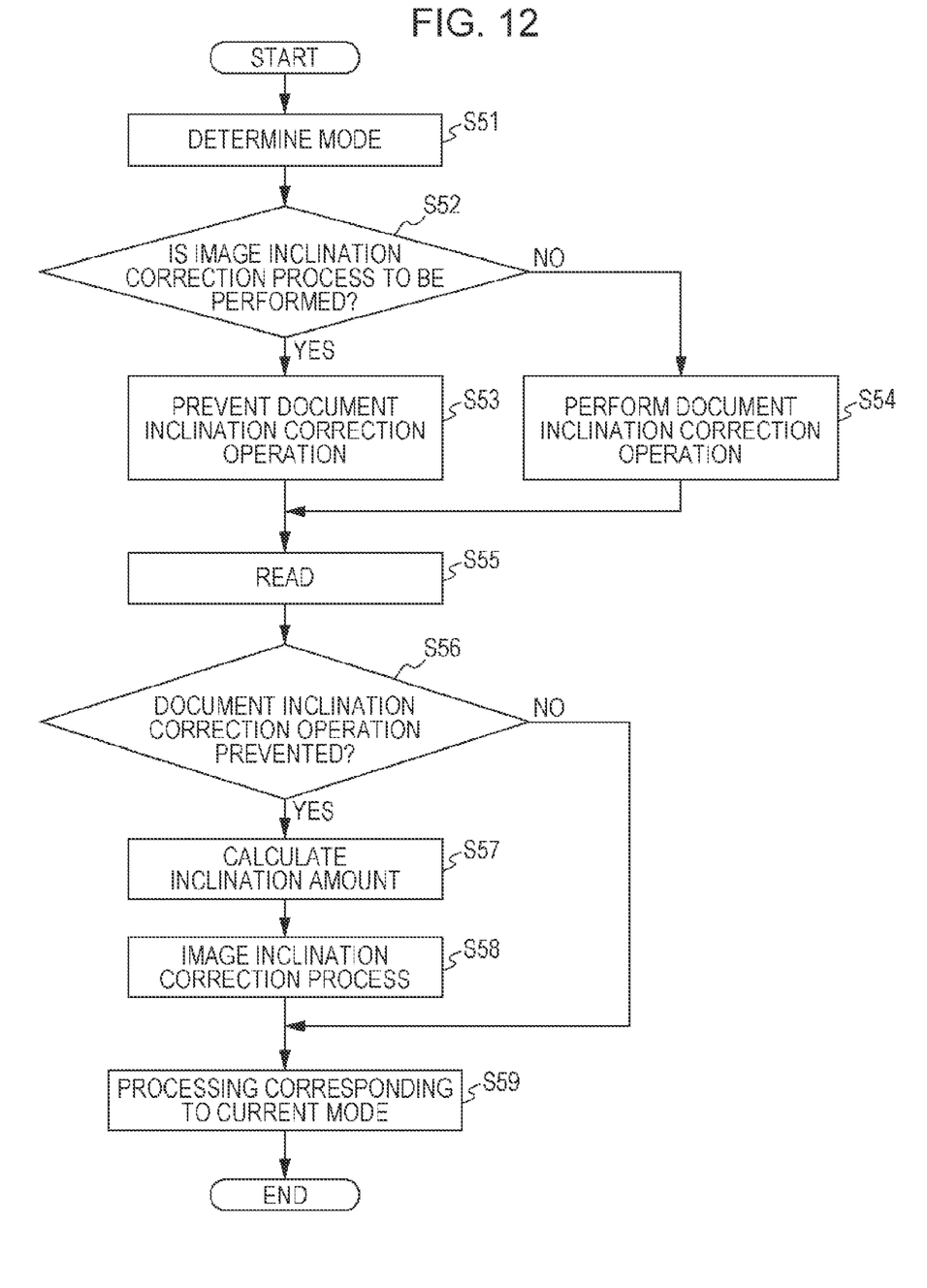
FIG. 12 is a flowchart illustrating a fifth example.

FIG. 12 is a flowchart illustrating a fifth example. The fifth example corresponds to a third aspect of the invention.

The fifth example of FIG. 12 is not limited to the FAX transmission mode, but is applied to all the modes that involve reading an image of a document using the image reading device 10. The fifth example corresponds to the fourth example of FIG. 11 if the mode is limited to the FAX transmission mode.

First, the mode is determined (step S51). The "mode" in step S51 is one of modes that are classified such that a determination may be made as to whether to perform an image inclination correction process on image information. For example, if step S51 is applied to the fourth example of FIG. 11, the FAX transmission mode (step S41) and the mode for reading a standard size document (step S42) are considered as one mode.

After the mode is determined in step S51, a determination is made as to whether the mode is a mode in which an image inclination correction process is to be performed on image information (step S52). If the mode is a mode in which an image inclination correction process is to be performed on image information, a document inclination correction operation that causes the document to hit the rollers in the transporting system is prevented (step S53). On the other hand, if the mode is a mode in which an image inclination correction process is not to be performed on image information, a document inclination correction operation is performed by causing the document to hit the rollers (step S54). Then, a reading operation is performed (step S55).

After that, if a document inclination correction operation is prevented (step S56), a document inclination amount calculation process (step S57) and an image inclination correction process (step S58) are performed on the image information. On the basis of image information obtained by the correction process, processing corresponding to the current mode, such as FAX transmission in the FAX transmission mode (see FIG. 11, step S49), is performed (step S59).

On the other hand, if a document inclination correction operation is performed by causing the document to hit the rollers (step S54), on the basis of image information before an image inclination correction process which is obtained by the reading operation (step S55), processing corresponding to the current mode is performed (step S59).

Figure 13:
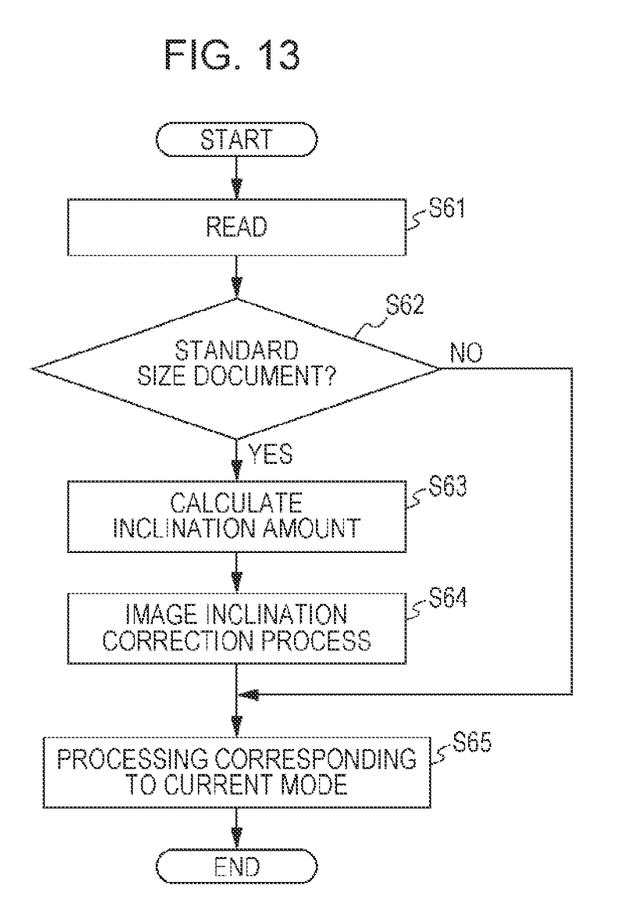
FIG. 13 is a flowchart illustrating a sixth example.

FIG. 13 is a flowchart illustrating a sixth example. The sixth example corresponds to an aspect in which the present invention is realized as the above-described image reading device.

In this example, an image of the document is read (step S61).

Then, a determination is made as to whether the document is a standard size document (step S62). If the document is a standard size document, an inclination amount calculation process (step S63) and an image inclination correction process (step S64) are performed on the image information.

On the basis of new image information obtained by these processes, processing corresponding to the mode, such as FAX transmission and transmission to a computer via the I/O interface 40 (see FIG. 1), is performed.

If the document is a non-standard size document, processing corresponding to the mode is performed without making any changes to the image information obtained by the reading operation of step S61 (step S65).

The sixth example is also useful for the users who mostly use standard size documents.

Note that, in the case of the sixth example of FIG. 13, since the process of FIG. 13 is performed regardless of the mode, a function of correcting an inclination of a document by causing the document to hit the rollers is not needed.

Further, in the case of the sixth example of FIG. 13, the present invention does not have to be realized as a multifunction apparatus, and may be applied to an apparatus only having a scanner function, or an apparatus only having a copier function, for example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A multifunction apparatus that includes an image reading device which reads an image formed on a document so as to generate image information and an image forming device which forms an image on paper on the basis of the image information, and that has at least a facsimile function and a copy function, the multifunction apparatus comprising:

a transporting unit that transports the document such that the document passes through a reading position;

a reading unit that irradiates the document passing through the reading position with light and reads reflected light so as to generate image information representing an edge of the document and the image of the document;

an inclination amount calculating unit that calculates an inclination amount of the document passing through the reading position, on the basis of the image information obtained by the reading unit;

a first inclination correcting unit that corrects an inclination of the image represented by the image information which is generated by the reading unit by reading the document, on the basis of the inclination amount of the document calculated by the inclination amount calculating unit, so as to generate new image information representing the image whose inclination is corrected; and     a controller that prevents, in a transmission mode for transmitting image information using the facsimile function, the first inclination correcting unit from performing an image inclination correction operation, and transmits a facsimile signal on the basis of the image information before inclination correction which is generated by the reading unit by reading the document for image information transmission.

2. The multifunction apparatus according to claim 1, further comprising:

a determining unit that determines whether the document which is read is a standard size document whose size is known by the multifunction apparatus or a non-standard size document;

wherein, in the transmission mode, if the determining unit determines that the document is a standard size document, the controller causes the first inclination correcting unit to operate even in the transmission mode and transmits a facsimile signal on the basis of the image information representing the image whose inclination is corrected.

3. The multifunction apparatus according to claim 1, further comprising:

a second inclination correcting unit that is disposed upstream of the reading position in a direction in which the transporting unit transports the document and that corrects an inclination of the document by causing a leading edge of the transported document to hit the second inclination correcting unit;

wherein the controller switches between inclination correction by the first inclination correcting unit and inclination correction by the second inclination correcting unit.

4. The multifunction apparatus according to claim 1, further comprising:

a determining unit that determines whether the document which is read is a standard size document whose size is known by the multifunction apparatus or a non-standard size document; and     a second inclination correcting unit that is disposed upstream of the reading position in a direction in which the transporting unit transports the document and that corrects an inclination of the document by causing a leading edge of the transported document to hit the second inclination correcting unit;

wherein, in the transmission mode, if the determining unit determines that the document is a standard size document, the controller prevents the second inclination correcting unit from performing a document inclination correction operation, and if the determining unit determines that the document is a non-standard size document, the controller causes the second inclination correcting unit to perform a document inclination correction operation.

5. The multifunction apparatus according to claim 2, further comprising:

a second inclination correcting unit that is disposed upstream of the reading position in a direction in which the transporting unit transports the document and that corrects an inclination of the document by causing a leading edge of the transported document to hit the second inclination correcting unit;

wherein, in the transmission mode, if the determining unit determines that the document is a standard size document, the controller prevents the second inclination correcting unit from performing a document inclination correction operation, and if the determining unit determines that the document is a non-standard size document, the controller causes the second inclination correcting unit to perform a document inclination correction operation.

6. The multifunction apparatus according to claim 1, further comprising:

a background unit that is disposed at a back side opposite a front surface of the document passing through the reading position, the front surface being irradiated with light;

wherein the reading unit reads reflected light from the background unit so as to generate image information including information on an edge of the document passing through the reading position; and     wherein the inclination amount calculating unit calculates the inclination amount of the document passing through the reading position, on the basis of the information on the edge of the document included in the image information generated by the reading unit.

\* \* \* \* \*